United States Patent

[11] 3,571,697

| [72] | Inventor | Donald E. Phillips<br>Cedar Rapids, Iowa |
|---|---|---|
| [21] | Appl. No. | 783,930 |
| [22] | Filed | Dec. 16, 1968 |
| [45] | Patented | Mar. 23, 1971 |
| [73] | Assignee | Collins Radio Company<br>Dallas, Tex. |

[54] VARIABLE IMPEDANCE SWITCHING REGULATOR
21 Claims, 6 Drawing Figs.

[52] U.S. Cl. .................................................. 323/17,
323/22, 323/38
[51] Int. Cl. ............................................. G05f 1/56
[50] Field of Search ........................... 323/1, 4, 9,
16—19, 22 (T), 38, 63; 321/2

[56] References Cited
UNITED STATES PATENTS

| 3,215,925 | 11/1965 | Rieke .......................... | 323/63 |
| 3,263,099 | 7/1966 | Bedford ....................... | 321/2UX |
| 3,327,202 | 6/1967 | Mills ............................ | 323/22 |
| 3,381,202 | 4/1968 | Loucks et al. ............... | 321/2 |
| 3,427,525 | 2/1969 | Thornwall .................... | 321/2 |
| 3,453,521 | 7/1969 | Schultz et al. .............. | 321/2 |

*Primary Examiner*—J. D. Miller
*Assistant Examiner*—A. D. Pellinen
*Attorneys*—Robert J. Crawford and Bruce C. Lutz ABSTRACT: A DC step-up voltage regulator with a series arrangement of a raw DC source and an energy storing inductor which are alternately connected to a low impedance circuit to build up the inductor current and to an output circuit which includes a capacitor which is charged by the current flow from the inductor. A control circuit varies the amount of inductor current buildup needed to hold the output voltage constant and also provides periodic and constant time intervals of sufficient duration to discharge the inductor current into the capacitor.

INVENTOR.
DONALD E. PHILLIPS

BY *Donald W. Phillips*

ATTORNEY

INVENTOR.
DONALD E. PHILLIPS

BY Donald W. Phillips
ATTORNEY

VARIABLE IMPEDANCE SWITCHING REGULATOR

This invention relates generally to voltage regulators and more particularly to a family of circuits which function to regulate a DC voltage and also to step-up, stepdown, or reverse said DC voltage.

In the prior art there are many types of DC regulators. One such prior art device comprises an inductor which is connected in series between the raw DC source and a pair of circuits. The first of these circuits is a gated, low impedance path which, when connected to the inductor, permits a current to build up in the inductor. The second of the aforementioned pair of circuits comprises a diode means connected in series with the parallel combination of a load resistor and a capacitor. When the first circuit is opened, i.e., is made nonconductive, the current which has been built up in the inductor will then be caused to flow through the diode to charge the capacitor and provide a stepped up regulated voltage across the load resistor.

In the prior art device, the gating means is opened cyclically and at a constant frequency, with the time intervals between openings being apportioned between inductor current buildup and inductor current discharge into the capacitor, in accordance with the regulation needed in the output voltage. More specifically, if the output voltage drops below a desired value, the low impedance path is connected to the inductor a greater proportion of a given cycle so that the inductor current builds up to a higher value than when the buildup time is less. The higher current charges the capacitor to a higher potential during the remaining portion of the cycle to raise the output voltage level. However, such prior art structure has two distinct disadvantages. The first of these is a time lag which occurs after the inductor current buildup time is increased. It follows that the inductor current discharge time interval, i.e., the time interval when the inductor current is flowing into the capacitor, is less. During the initial stage of the output voltage correction, the inductor current buildup is not sufficient to overcome the decreased inductor current discharge time. Thus for a short time interval after correction of the output voltage to a higher value is initiated the said output voltage in actuality will decrease further instead of rising. Eventually, however, the inductor current will build up to a value where it will charge the capacitor sufficiently to bring the output voltage up to its desired value. The second disadvantage of the prior art circuit is one of poor regulation which is due directly to the time lag discussed above.

A primary object of the present invention is to provide a reliable DC voltage regulator with good regulation and with a fast response.

A second purpose of the invention is a DC voltage regulator in which the time duration of the inductor current buildup can be substantially extended without shortening the time duration allowed for discharge of the inductor current into the capacitor of the output circuit.

A third aim of the invention is a DC voltage regulator of the type employing inductor stored energy and having improved regulation.

A fourth purpose of the invention is to provide a basic DC voltage regulator circuit having good regulation, fast response, and the capability of stepping up a DC voltage, stepping down a DC voltage, or reversing the polarity of the supplied DC voltage.

A fifth object of the invention is a family of DC voltage regulators of the type employing inductor stored energy and having the capability of stepping up a DC voltage, stepping down a DC voltage, or reversing the supplied DC voltage.

A sixth purpose of the invention is the improvement of DC voltage regulators generally.

In accordance with the invention the low impedance path for the inductor comprises the electron collecting-electron emitting electrode circuit of a transistor, or some other suitable electron valve means. A control circuit, including a differential amplifier which compares the output voltage of the circuit with a reference voltage, and a driver circuit responsive to differential amplifier output, controls the saturation current level of the transistor. Said saturation current level in turn determines the amount of inductor current buildup; the greater the transistor saturation current, the greater the inductor current buildup. A pulse generating means responds to a condition of saturation of the transistor to disable the driver for a fixed time interval, thereby cutting off the transistor. After said fixed time interval the driver is again enabled and will turn on the transistor which will now have a new current saturation level in accordance with the magnitude of the output of the differential amplifier.

In accordance with another form of the invention, the said second circuit (the load circuit) is coupled by an iron core transformer means to the inductor in series with the DC source. The diode means of the load circuit is connected in series between the transformer secondary and the parallel combination of the capacitor and the output load resistance. The voltage appearing across the output load resistance is supplied to a differential amplifier which compares it with the reference voltage. The output of the differential amplifier is supplied through suitable isolation means to the remainder of the circuit which is quite similar to the first embodiment described above and comprises a driver circuit for energizing a transistor which then forms a low impedance path, and a one-shot device which is responsive to a condition of saturation of the transistor to disable the driver for a given time interval. The transistor has a current saturation level dependent upon the magnitude of the differential amplifier output signal.

In accordance with a third form of the invention the DC voltage source, the low impedance path which consists of a transistor, the inductor, and a resistive-capacitor load circuit are connected in series in the order listed. The current will build up in said inductor when said transistor is in its low impedance state. A diode connected across said inductor and said resistive capacitive load provides a continuing path for the inductor current when the transistor is cut off. This modification of the invention provides a stepdown function of the DC voltage level.

A fourth embodiment embodiment of the invention consists of the DC voltage source, the low impedance path which again comprises a transistor, a diode, and a resistive-capacitive load connnected in series arrangement, in the order listed. An inductor is connected in parallel with the series combination of said low impedance path and said DC voltage source so that a current will buildup therein when said transistor is in its low impedance state. Said inductor further is connected in parallel with the series arrangement of said diode and said resistive-capacitive load means. The diode is poled such that when the transistor is cut off it will provide a low impedance path for the current buildup in said inductor, thus charging said capacitor in a polarity opposed to that of the DC voltage source.

The above-mentioned and other objects and features of the invention will be more fully understood from the following detailed description when read in conjunction with the drawings in which.

Figure 1:
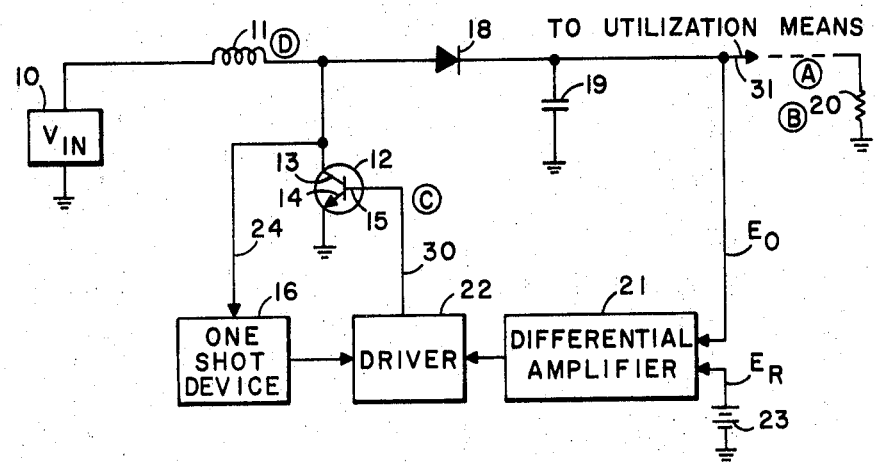
FIG. 1 is a combination schematic and block diagram of one form of the invention.

Referring now to FIG. 1, the source of DC voltage 10 which is to be stepped up and regulated is connected across load resistor 20 through the series arrangement of inductor 11 and diode 18. Basically the operation of the circuit is as follows: a current buildup is permitted through inductor 11 and a low impedance path, comprising energized transistor 12, for a given interval of time. Transistor 12 is then cut off so that the current through inductor 11 must flow through diode 18 and into the output circuit comprising capacitor 19 and resistor 20. Capacitor 19 can be charged to have a given, predetermined voltage which, due to high reverse impedance of diode 18, can be substantially higher than the voltage of DC source 10.

Regulation is obtained by means of differential amplifier 21 which compares the output voltage $E_0$ with the reference voltage $E_r$ of source 23 to produce an output signal which is supplied to driver 22. Driver 22 may be a normally closed relay in which the normally closed contacts connecting amplifier 21 and to lead 30 are opened by a signal applied to the operating coil from one-shot 16 in some embodiments. An operable relay may be similar to that shown as relay 12 in a Martin Pat. No. 2,289,794 issued Jul. 14, 1942. Driver 22 in turn produces an output signal whose magnitude is proportional to the magnitude of the differential amplifier output signal. Such output signal of driver 22 is supplied through lead 30 to the base of the transistor 12 to cause transistor 12 to become conductive, thus providing a low impedance path for the current through series inductor 11. As the current through inductor 11 and transistor 12 increases, the transistor 12 will, at some point determined by the base current, become saturated and the potential of the collector electrode 13 will begin to rise.

One-shot device 16, which can be a Schmitt trigger and multivibrator as shown in Electronics Jun. 13, 1966, Page 110 and Sept. 29, 1961, Page 86, respectively, for example, is responsive to such rise in collector potential to generate a pulse of predetermined time duration which functions to cut off driver 22, which in turn cuts off transistor 12 through output lead 30.

The current which has been built up in inductor 11 is again forced to flow through diode 18 and into the capacitor 19 to recharge said capacitor toward the desired potential of the reference voltage.

It is important to note that the output signal of driver 22 supplied to the base 15 of transistor 12 determines the current saturation level of transistor 12, and therefore also controls the degree of current buildup which can take place in inductor 11 as well as the time interval that the transistor will remain in a conductive state.

On the other hand, once the one shot device 16 is triggered, it will always produce a pulse of constant width so that the driver 22 will always be disabled for a constant time interval, during which time interval the current which has built up in inductor 11 will flow through diode 18 and into capacitor 19.

Figure 3:
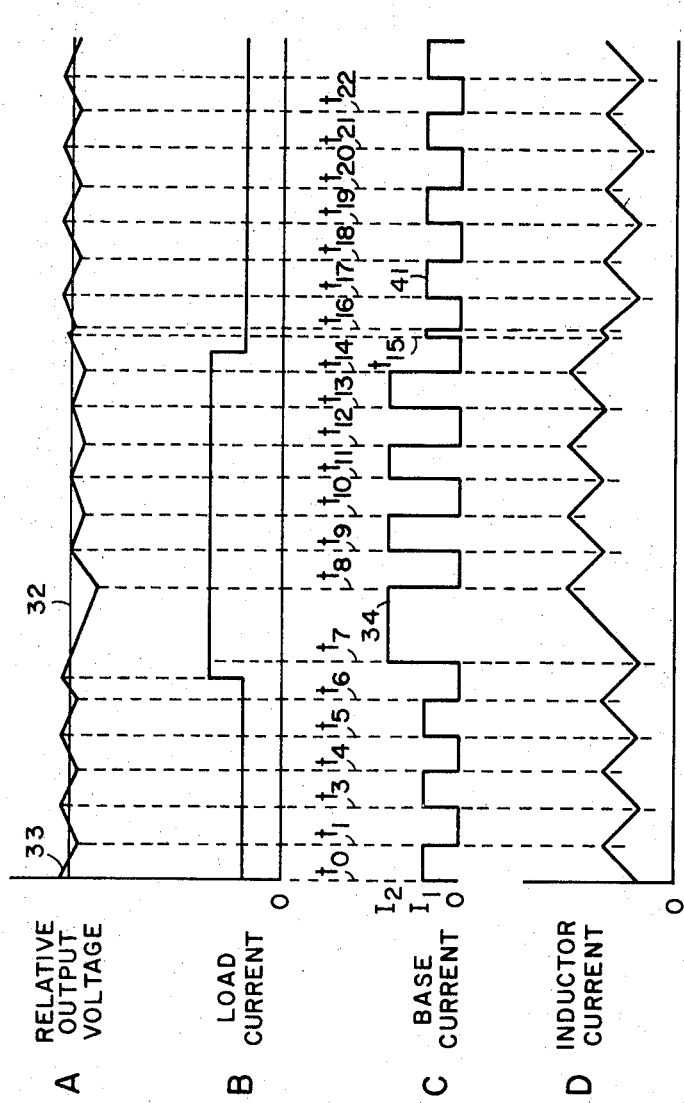
FIG. 3 is a set of waveforms showing the relation between the inductor current, the driver output and the DC voltage output of the circuits of FIGS. 1 and 2.
Figure 4:
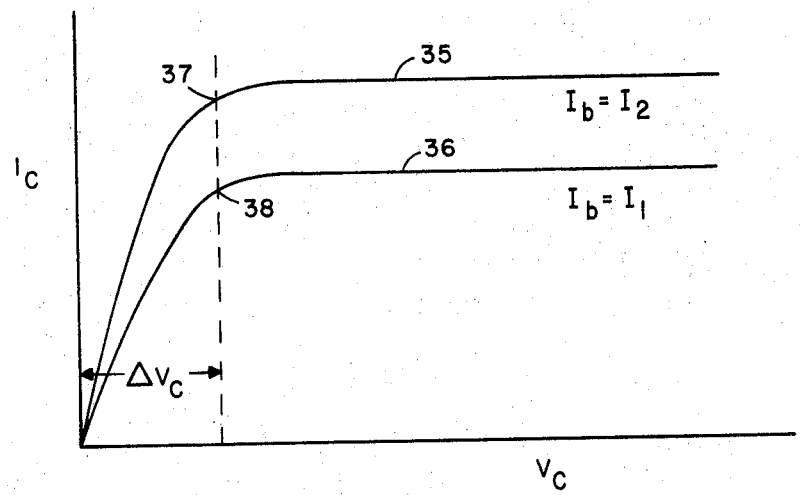
FIG. 4 shows two characteristic curves of the transistor illustrating the different levels of saturation current obtainable with different values of base electrode biasing potentials.

The foregoing brief discussion of the circuit of FIG. 1 and the operation thereof will be more fully understood when considered in conjunction with the waveforms of FIGS. 3 and 4. In FIG. 3a there is shown the output voltage on output terminal 31 of FIG. 1. The straight line 32 of FIG. 3a represents the ideal DC output voltage and the line 33 represents the actual voltage that might appear on output terminal 31 of FIG. 1. The waveform 33 is considerably exaggerated for purposes of discussion. FIG. 3b represents a changing load current being drawn by 31.

FIG. 3c represents the output of driver 22, and more specifically represents the current waveform appearing on output terminal 30 of driver 22, with the upper levels representing the "on" condition of transistor 12 and the lower level representing the "off" condition of transistor 12. In FIG. 3c all of the cutoff time intervals, as for example $t_1-t_3$, $t_4-t_5$, $t_6-t_7$, $t_8-t_9$, and $t_{10}-t_{11}$, etc. are of equal time duration and represent the cutoff condition of transistor 12 due to the action of the one-shot device 16 of FIG. 1.

FIG. 3d represents the current flow through inductor 11. It can be seen such current flow rises and falls. More specifically the current rises during those time intervals when transistor 12 is conductive to establish a low impedance path for inductor 11, and falls during those time intervals when transistor 12 is cut off so that the current through inductor 11 must flow through diode 18 and into the output circuit comprising capacitor 19 and resistor 20.

In FIG. 3 between times $t_0$ and $t_6$, the actual output voltage 33 (FIG. 3a) remains quite close to the desired output voltage 32. Such output voltage can be seen to increase slightly during those time intervals that the inductor 11 current is flowing through diode 18 and into capacitor 19, and can be seen to decrease slightly during those time intervals that the current buildup in inductor 11 is occuring through low impedance path 12.

Between $t_6$ and $t_7$, however, assume that the load current rises to a higher value (3b). The current buildup in inductor 11 is inadequate to maintain the charge in capacitor 19 sufficiently to hold the output voltage up to level 32 in FIG. 3a.

Thus the voltage level 33 at time $t_7$ to $t_8$ will be substantially lower than the reference voltage $E_{23}$ so that differential amplifier 21 will respond to said two voltages to produce a larger output signal to driver 22. Said driver 22 will in turn produce a more positive output signal as represented by the magnitude of the pulse 34 at time $t_7$ to $t_8$ and will supply said pulse to the base of transistor 15. Such increased current in base 15 of transistor 12 will increase the saturation level of the transistor 12 as shown in the waveforms of FIG. 4. More specifically, in FIG. 4, the curve 36 shows the collector voltage versus collector current characteristic when the base current $I_b$ is equal to $I_1$ and the curve 35 shows the collector current versus collector voltage relationship when the base current $I_b$ is increased to a value $I_2$. It can be seen that to produce a given increase in collector voltage $\Delta V_c$ a larger collector current will be required as the base current increases. Thus, in FIG. 4, the collector current 37 is considerably larger than collector current 38 for a given change in collector voltage. The aforementioned given change in collector voltage is important since such potential change is the one required to trigger one-shot device 16 which in turn disables driver 22 to cut off transistor 12.

Referring again to the waveforms of FIG. 3, it can be seen that since the current supplied to base 15 of transistor 12 at time $t_7$ to $t_8$ is substantially increased over the prior periods of conductivity of transistor 12, the inductor 11 current can build up to a considerably higher value than in said prior periods. Reference is made in FIG. 3d to the time interval $t_7-t_8$ which represents the current buildup in inductor 11 during the conductivity of transistor 12 represented by pulse 34 of FIG. 3b.

At time $t_8$, the collector potential of transistor 12 reaches a value represented by point 37 in FIG. 4 and one-shot device 16 of FIG. 1 is activated to turn off driver 22, thereby cutting off transistor 12.

The large current through inductor 11 at time $t_8$ is caused to flow through and into capacitor 19. Consequently the rate of charge of capacitor 19 will be quite large during time interval $t_8-t_9$ as shown by the waveform of FIG. 3a, and in most cases will be sufficient to hold the output voltage 33 to a level only slightly below 32. The output from the differential amplifier is then sufficient to cause driver 22 to continue to produce the pulses of level 34 of FIG. 3 which will maintain the saturation current level of transistor 12 at a certain level whereby the inductor 11 current buildup will be just sufficient to maintain output voltage 33 at its proper value until between times $t_{14}$ and $t_{15}$ when the output load current decreases.

It will be noted in the waveform of FIG. 3c that each of the pulses, such as pulse 34 and 41, are shown of constant magnitude over their duration. Such is not necessarily true in practice because (1) peaking of the beginning and end of the waveform may be necessary to achieve fast switching of transistor 12, and (2) the variation of output voltage 33 over the cycle tends to cause a variation of the driver 30 output pulse amplitudes during the pulse duration, which effect may be minimized by proper filtering of the output voltage 33 before being applied to the differential amplifier 21. The idealized waveforms in FIG. 3c most clearly illustrate the control operation.

Also, the inductor current shown in the waveform of FIG. 3d will rise and fall by amounts determined directly by the level of saturation of transistor 12, and indirectly by the magnitude of the voltage 33 of FIG. 3a.

Figure 2:
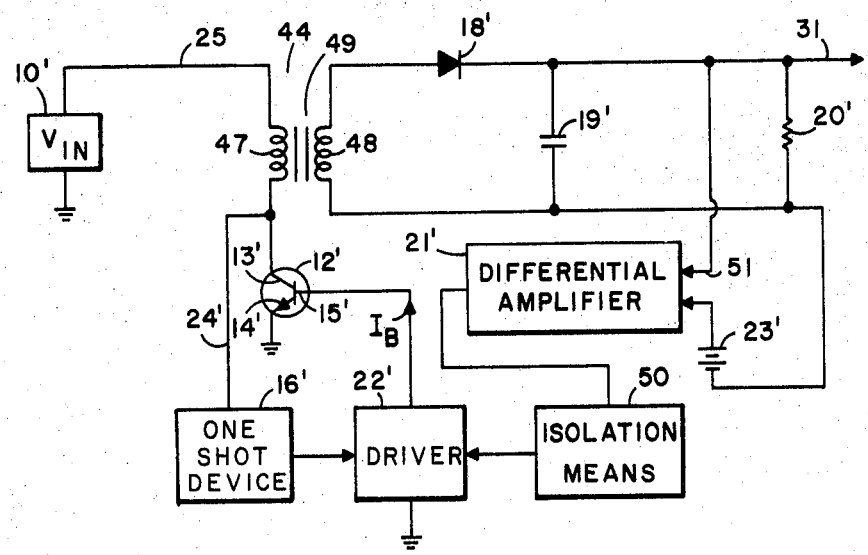
FIG. 2 is another combination schematic and block diagram of another form of the invention wherein the output circuit is transformer coupled to a series inductor.

Referring now to FIG. 2 there is shown another form of the invention in which those elements having corresponding elements in FIG. 1 are identified by the same reference characters, although primed.

The principal difference between the circuit of FIG. 2 and that of FIG. 1 is that in FIG. 2 the energy supplied to the output circuit comprised of capacitor 19' and resistor 20' is transferred through an iron core transformer 44 rather than through a conventional series connection as shown in FIG. 1.

The operation of transformer 44 is somewhat different from the operation of a conventional transformer, as discussed below. More specifically, the transformer 44 is comprised of a primary winding 47 and a secondary winding 48, both of which are wound on a core 49 of a material, such as iron or ferrite, which will provide tight coupling. The core 49 functions as an energy storage device. More particularly as the current flow through the primary winding 47 increases, a magnetic field is built up in the core 49. Then when transistor 12' becomes nonconductive and the current through the primary winding 47 drops to zero, the energy stored in core 49 is released through secondary winding 48. Said energy takes the form of the current which flows through diode 18' and into capacitor 19'.

The foregoing is perhaps better understood from a specific example. Assume that the raw DC voltage from source $V_{in}$ is 25 volts and that the desired voltage output is 50 volts, as determined by the 50 volt reference voltage 23'. At beginning of a cycle, i.e., at a point in time when transistor 12' first becomes conductive, the current flow through primary winding 47 will increase until transistor 12' begins to saturate and the collector voltage rises to a point sufficient to energize one-shot device 16' which, as discussed in connection with FIG. 1, disables driver 22' and cuts off transistor 12'. At the time of cutoff, the voltage across primary winding 47 will be equal to 25 volts, less the voltage drop across transistor 12'.

As soon as transistor 12' becomes nonconductive, the magnetic field buildup in iron core 49 will begin to decay and the resultant flux change will induce a voltage in secondary winding 48. Such induced voltage will be clamped near the level of the voltage across capacitor 19', which voltage will be assumed to have become established as being substantially equal to the 50 volt reference voltage 23'. Thus the voltage across winding 48 is about 50 volts, which is reflected back to primary winding 47, but with a reversal of polarity, so that approximately 50 volts will appear on collector electrode 13' of nonconductive transistor 12'.

The current generated in secondary winding 48' after cutoff of transistor 12' will flow through diode 18' to replenish the charge on capacitor 19'. As discussed in connection with FIG. 1, the various control circuits, including differential amplifier 21', driver 22', and one-shot device 16', established the duty cycle such that the energy supplied to capacitor 19' is substantially equal to the energy consumed by the load, such as resistor 20'. Thus the potential on output lead 31 remains at the regulated value of 50 volts.

Isolation means 50 is provided in the circuit to connect the output of the differential amplifier 21' to the driver 22'. Such isolation means is required since the output circuit is coupled to the input circuit via transformer 44, and comprises, for example, a DC to AC converter, a transformer means, and an AC to DC converter connected in cascade, with the DC output being supplied to input lead 51 of differential amplifier 21', so that the output voltage between 31 and 51 can be isolated from the input ground.

Figure 5:
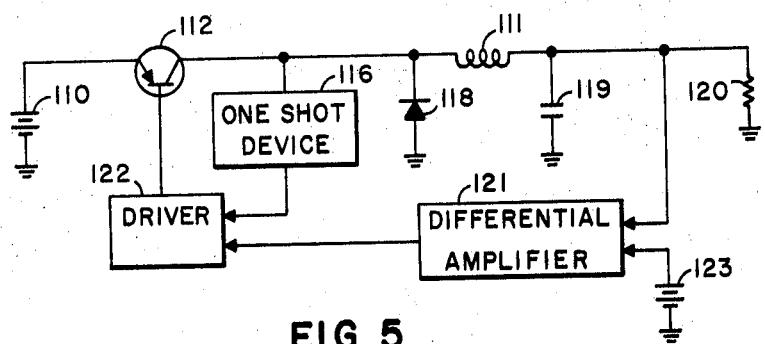
FIG. 5 is a combination schematic and block diagram of a form of the invention which functions to step down the applied DC voltage.

Referring now to FIG. 5 there is shown a form of the invention which functions to step down the supplied DC voltage, as well as regulate said DC voltage and provide fast response. In FIG. 5 the low impedance path, in the form of transistor 112, is connected in series arrangement with the DC source 110, inductor 111, and the output circuit consisting of capacitor 119 and load resistor 120. The diode 118 is connected in parallel with the series arrangement of inductor 111 and the output circuit consisting of capacitor 119 and resistor 120.

The control circuit, consisting of differential amplifier 121, reference voltage 123, one-shot device 116, and driver 122 functions in the same manner as do the control circuits of FIGS. 1 and 2. During the periods of time that transistor 112 is in its low impedance condition a current is built up in inductor 111. When transistor 112 is cut off, the built-up current in inductor 111 will continue to flow in a path now including diode 118, and will function to charge capacitor 119 in a manner similar to that discussed in connection with FIGS. 1 and 2.

Since the low impedance path of transistor 112 is connected in series arrangement with the DC voltage source, the inductor 111, and the load circuit, the output voltage appearing across capacitor 119 can never be larger than that of the input voltage 110 and, in point of fact, must be somewhat less. More specifically, the actual value of the voltage appearing across 119 will be determined by the magnitude of reference voltage 123, which can be any value less than that of input source 110.

Figure 6:
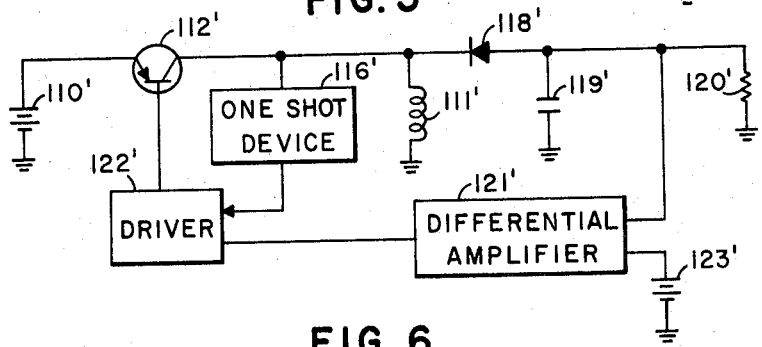
FIG. 6 is a combination schematic and block diagram of another form of the invention which functions to reverse the polarity of the applied DC voltage.

Referring now to FIG. 6 there is shown a fourth form of the invention which functions to reverse the supplied DC voltage as well as regulating said voltage. In FIG. 6 the low impedance path in the form of transistor 112' is connected in series arrangement with the DC source 110', the diode 118', and the output circuit consisting of capacitor 119' in parallel with load resistor 120'. Inductor 111' is connected in parallel arrangement with the series arrangement of input source 110' and transistor 112'. Inductor 111' is also connected across the series arrangement of diode 118' and the output load circuit consisting of capacitor 119' and resistor 120'.

During those time intervals when transistor 112' is in its low impedance state a current will buildup in inductor 111'. Then when transistor 112' is cut off the current flow through inductor 111' will be sustained in a path comprising diode 118' and the output load circuit consisting of capacitor 119' and resistor 120'. It is apparent from the circuit of FIG. 6 that the current flow through diode 118' and inductor 111' is poled so that the voltage created across capacitor 119' is negative, which is the opposite polarity of the voltage supplied from source 110'.

It is also readily apparent that FIG. 6 can be easily modified to produce a positive DC output voltage from a negative DC input voltage. Such modification consists essentially of reversing the polarities of transistor 112', the diode 118', and the DC reference source 123'. Appropriate changes must also be made in the specific design of the control circuit including differential amplifier 121', one-shot device 116' and the driver 122'.

I claim:

1. A DC voltage regulator comprising:

DC voltage source means;

load means comprising the series arrangement of diode means and capacitive impedance means;

inductive coupling means connecting said DC voltage source means to said load means in substantially series arrangement;

switching means connected in parallel with said load means and constructed when activated to provide a low impedance path thereacross;

control means responsive to the voltage across said capacitive impedance means to provide periodic activation of said switching means of time intervals of sufficient length to cause energy storage in said inductive coupling in an amount equal to the energy dissipation in said load means; and said control means further constructed to provide periodic inactivations of said switching means of constant time intervals between each period of activation while the voltage across said capacitive impedance means is varying.

2. A DC voltage regulator in accordance with claim 1 in which said switching means comprises:
  electron valve means having a variable saturation current level and comprising an electron emitting electrode, an electron collecting electrode, and an electron control electrode; and
  said electron emitting electrode-electron collecting electrode forming said low impedance path, and said electron control electrode responsive to variations in the output voltage appearing across said capacitive impedance means to control the saturation current level of said electron valve means.

3. A DC voltage regulator in accordance with claim 1 in which said control means comprises:
  voltage comparing means for comparing the output voltage appearing across said capacitive impedance means with a predetermined voltage level and for producing an output control signal whose magnitude and polarity are in accordance with the magnitude and polarity of the voltage difference between said output voltage and said predetermined voltage level;
  gating means for supplying said output control signal to said switching means to activate said switching means; and
  constant width pulse generating means responsive to a voltage of predetermined magnitude across said switching means to supply one of said constant width pulses to said gating means to cut off said gating means.

4. A DC voltage regulator in accordance with claim 3 in which said inductive coupling means comprises transformer means having a primary winding and a secondary winding;
  said primary winding being connected between and in series with said DC voltage source means and said switching means; and
  said secondary winding being connected across said series arrangement of said diode means and said capacitive impedance means.

5. A DC voltage regulator in accordance with claim 3 in which said switching means comprises:
  electron valve means having a variable saturation current level and comprising an electron emitting electrode, an electron collecting electrode, and an electron control electrode; and
  said electron emitting electrode-electron collecting electrode forming said low impedance path and said electron control electrode responsive to said output control signal to control the saturation current level of said electron valve means.

6. A DC voltage regulator in accordance with claim 1 in which said inductive coupling means comprises transformer means having a primary winding and a secondary winding:
  said primary winding being connected between and in series with said DC voltage source means and said switching means; and
  said secondary winding being connected across said series arrangement of said diode means and said capacitive impedance means.

7. A DC voltage regulator means comprising:
  the series arrangement of a DC voltage source, inductive means, diode means, and capacitive impedance load means;
  variable low impedance means periodically connectable across said diode means and said capacitive impedance load means in response to first control signals supplied thereto and constructed to produce first output signals in response to current flow therethrough whose magnitudes are determined in accordance with characteristics of said first control signals; and
  control means for periodically supplying to said variable low impedance means first control signals whose magnitudes vary in accordance with the magnitude of the output voltage across said capacitive impedance load means; and said control means further constructed to substantially open-circuit said variable low impedance for constant time intervals, in spite of voltage variations across said capacitive impedance load means, between said first control signals sufficient for discharge of the energy stored in said inductive means into said capacitive impedance load means.

8. A DC voltage regulator in accordance with claim 7 in which said low impedance means comprises:
  electron valve means having a variable saturation current level and comprising an electron emitting electrode, an electron collecting electrode, and an electron control electrode; and
  said electron emitting electrode-electron collecting electrode forming said low impedance path, and said electron control electrode responsive to variations in the output voltage appearing across said capacitive impedance load means to control the saturation current level of said electron valve means.

9. A DC voltage regulator in accordance with claim 7 in which said control means comprises:
  voltage comparing means for comparing the output voltage appearing across said capacitive impedance load means with a predetermined voltage level for producing said first control signals whose magnitude and polarity are in accordance with the magnitude and polarity of the voltage difference between said output voltage and said predetermined voltage level;
  gating means for supplying said first control signals to said low impedance means; and
  constant width pulse generating means responsive to a voltage of predetermined magnitude across said low impedance means to supply one of said constant width pulses to said gating means to cut off said gating means.

10. A DC voltage regulator in accordance with claim 9 in which said inductive means comprises transformer means having a primary winding and a secondary winding;
  said primary winding being connected between and in series with said DC voltage source and said low impedance means; and
  said secondary winding being connected across said series arrangement of said diode means and said capacitive impedance load means.

11. A DC voltage regulator in accordance with claim 9 in which said controllable low impedance means comprises:
  electron valve means having a variable saturation current level and comprising an electron emitting electrode, an electron collecting electrode, and an electron control electrode; and
  said electron emitting electrode-electron collecting electrode forming said low impedance path, and said electron control electrode responsive to variations in the output voltage appearing across said capacitive impedance load means to control the saturation current level of said electron valve means.

12. A DC voltage regulator in accordance with claim 7 in which said inductive means comprises transformer means having a primary winding and a secondary winding:
  said primary winding being connected between and in series with said DC voltage source and said low impedance means; and
  said secondary winding being connected across said series arrangement of said diode means and said capacitive impedance load means.

13. A DC voltage level switching regulator comprising:
  a DC voltage source means;
  the series arrangement of a current responsive-variable impedance switching means and an inductive means, connected in series with said DC voltage source means;
  said variable impedance switching means constructed to be variably conductive or substantially nonconductive in response to first control signals supplied thereto and to further vary its impedance when in a conductive condition in accordance with the current flow therethrough;

diode means;

capacitive impedance load means constructed to be in series with said diode means and said inductive means when said switching means is in a nonconductive condition;

control means responsive to the potential drop across said capacitive impedance load means with respect to a predetermined potential to produce said first control signals and to supply said first control signals to said switching means to cause said switching means to become conductive; and said control means further responsive to a predetermined potential change across said switching means to open-circuit said switching means for a predetermined time interval even when the potential drop across said capacitive impedance load means varies.

14. A DC voltage level switching regulator in accordance with claim 13 in which said variable impedance switching means comprises:

electron valve means having a variable saturation current level and comprising an electron emitting electrode, an electron collecting electrode, and an electron control electrode; and said electron emitting electrode-electron collecting electrode forming said variable impedance switching means path, and said electron control electrode responsive to variations in the output voltage appearing across said capacitive impedance load means to control the saturation current level of said electron valve means.

15. A DC voltage level switching regulator in accordance with claim 14 in which:

said capacitive impedance load means is connected in series with said DC voltage source means, said variable impedance switching means, and said inductive means; and in which said diode means is connected across the series combination of said inductive means and said capacitive impedance load means with respect to the current from said voltage source means.

16. A DC voltage level switching regulator in accordance with claim 15 in which said control means comprises:

voltage comprising means for comparing the output voltage appearing across said capacitive impedance load means with a predetermined voltage level and for producing said first control signals whose magnitude and polarity are in accordance with the magnitude and polarity of the voltage difference between said output voltage and said predetermined voltage level;

gating means for supplying said first control signals to said variable impedance switching means; and constant width pulse generating means responsive to a voltage of predetermined magnitude across said variable impedance switching means to supply one of said constant width pulses to said gating means to cut off said gating means for said predetermined time interval.

17. A DC voltage level switching regulator in accordance with claim 13 in which said control means comprises:

voltage comparing means for comparing the output voltage appearing across said capacitive impedance load means with a predetermined voltage level and for producing said first control signals whose magnitude and polarity are in accordance with the magnitude and polarity of the voltage difference between said output voltage and said predetermined voltage level;

gating means for supplying said first control signals to said variable impedance switching means; and constant width pulse generating means responsive to a voltage of predetermined magnitude across said controllable low impedance means to supply one of said constant width pulses to said gating means to cut off said gating means for said predetermined time interval.

18. A DC voltage level switching regulator in accordance with claim 13 in which:

said capacitive impedance load means is connected in series arrangement with said DC voltage source means, said variable impedance switching means and said diode means; and in which said inductive means is connected across the series combination of said diode means and said capacitive impedance load means with respect to the current from said DC voltage source means.

19. A DC voltage level switching regulator in accordance with claim 18 in which said variable impedance switching means comprises:

electron valve means having a variable saturation current level and comprising an electron emitting electrode, an electron collecting electrode, and an electron control electrode; and said electron emitting electrode-electron collecting electrode forming said variable impedance switching path, and said electron control electrode responsive to variations in the output voltage appearing across said capacitive impedance load means to control the saturation current level of said electron valve means.

20. A DC voltage level regulator in accordance with claim 18 in which said control means comprises:

voltage comparing means for comparing the output voltage appearing across said capacitive impedance load means with a predetermined voltage level and for producing said control signals whose magnitude and polarity are in accordance with the magnitude and polarity of the voltage different between said output voltage and said predetermined voltage level;

gating means for supplying said control signals to said variable impedance switching means; and constant width pulse generating means responsive to a voltage of predetermined magnitude across variable impedance switching means to supply one of said constant width pulses to said gating means to cut off said gating means for said predetermined time interval.

21. A DC voltage level switching regulator in accordance with claim 20 in which said variable impedance switching means comprises:

electron valve means having a variable saturation current level and comprising an electron emitting electrode, an electron collecting electrode, and an electron control electrode; and said electron emitting electrode-electron collecting electrode forming said variable impedance switching means path, and said electron control electrode responsive to variations in the output voltage appearing across said capacitive impedance load means to control the saturation current level of said electron valve means.